Dec. 25, 1956  H. D. HANSON  2,775,256
VALVED FITTING
Filed Aug. 13, 1954

Hugh D. Hanson
INVENTOR.

BY Charles E. Lightfoot
ATTORNEY

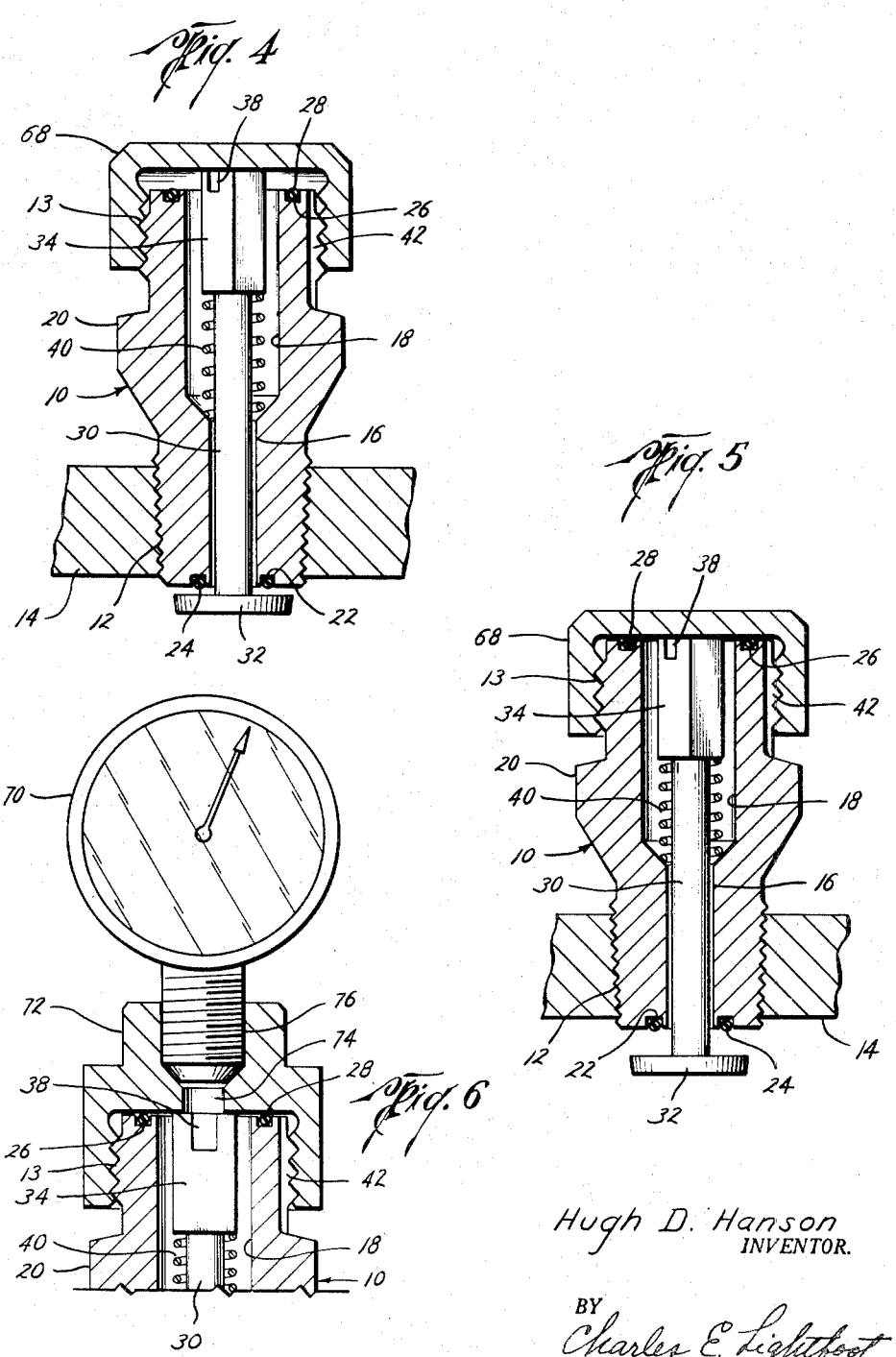

United States Patent Office 2,775,256
Patented Dec. 25, 1956

2,775,256

VALVED FITTING

Hugh D. Hanson, Houston, Tex.

Application August 13, 1954, Serial No. 449,635

1 Claim. (Cl. 137—322)

This invention relates to a valved fitting for use on equipment in which fluid is maintained under pressure, and more particularly to a multi-purpose fitting for the connection of various types of appliances or attachments to such pressure equipment.

In the operation of various types of apparatus in which fluid is maintained under pressure it is often desirable to provide means for bleeding off the pressure from some part of the apparatus, removing fluid under pressure therefrom or introducing fluid into the apparatus against the pressure of fluid therein. At times it is also frequently desirable to provide means for obtaining samples of fluid from a system or apparatus containing fluid under pressure or to apply means to the system for indicating the pressure therein, without interfering with the operation of the apparatus.

Apparatus in which fluid is maintained under pressure is sometimes provided with outlet connections for the attachment thereto of various appliances, but the uncapping of such outlets is often attended by a considerable element of danger and uncertainty for the operator, especially under circumstances in which the pressure in the system is not certainly known, and the attachment of appliances to such an outlet while open or the recapping of the outlet is frequently very difficult or impossible because of the pressure of the escaping fluid.

Various types of valve devices have been proposed whereby fluid could be removed from a system or apparatus in which fluid is maintained under pressure, or for the purpose of introducing fluids into such a system against the pressure of the fluid therein, but such devices usually possess the disadvantage that they are not easily adapted for general use with a wide range of appliances of different types and no satisfactory fitting has been found, heretofore, with which any of numerous types of appliances or attachments could be interchangeably used.

The present invention has for an important object the provision of a valved fitting for attachment to apparatus containing fluid under pressure and with which numerous different types of appliances may be interchangeably employed.

Another object of the invention is to provide a valved fitting including a valve and closure means attached to the fitting which may be operated to open and close the fitting and which is also engageable with the valve when the closure is in an open condition to open the valve.

A further object of the invention is the provision of a valved fitting, for use with apparatus containing fluid under pressure, including a valve arranged to be held in a closed position by the pressure of fluid in the apparatus and which is positioned to be engaged by an appliance when the appliance is connected to the fitting to move the valve toward open position.

Another object of the invention is to provide a valve fitting of the kind referred to, to which various types of appliances may be attached, and having a valve which in one position of such an appliance on the fitting is engageable with the appliance to open the valve, while in another position of the appliance on the fitting the valve is closed.

A further object of the invention is the provision of a valved fitting for use with pressure fluid apparatus for the connection to such apparatus of numerous types of appliances, and which includes valve means operable while an appliance is connected to the fitting to open the fitting but which also operates upon the removal of an appliance from the fitting to close the fitting against the escape of fluid from the apparatus.

A still further object of the invention is to provide a valved fitting of the type referred to which is of simple design and rugged construction capable of long withstanding the extreme conditions of hard usage and exposure to which articles of this character are customarily subjected.

The above and other important objects and advantages of the invention may best be understood from the following detailed description, constituting a specification of the same, when considered in conjunction with the annexed drawings, wherein —

Figure 4 is a view similar to that of Figure 1, showing the fitting of the invention with a closure cap applied thereto and in a position to permit the bleeding off of pressure fluid through the fitting, the valve of the fitting being in an open position by the cap;

Figure 5 is a view similar to that of Figure 4, showing the closure cap in closed position and sealing the fitting in closed condition; and Figure 6 is a view similar to that of Figure 1, illustrating the fitting of the invention as employed with a different type of appliance and showing the valve of the fitting in open condition.

Figure 1:
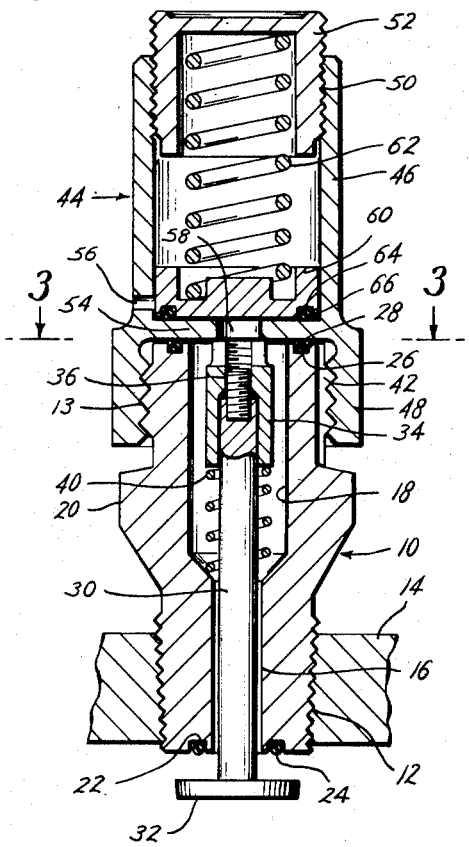
Figure 1 is a vertical, central, cross-sectional view of a preferred embodiment of the invention, showing the same with one type of appliance attached thereto and with the valve of the fitting in open position.

Referring now to the drawings in greater detail, the fitting of the invention includes a tubular body 10, which may conveniently be provided with an externally threaded end portion 12, for the connection of the fitting to any desired type of apparatus adapted to contain fluid under pressure, and which has a wall portion indicated at 14 provided with an internally threaded opening into which the portion 12 may be threaded. At its upper end the body is also provided with an externally threaded portion 13 for the connection thereto of various types of appliances to be used with the apparatus, in a manner to be more fully explained hereinafter. The body 10 may be formed with an internal passageway 16 at its lower end portion, which opens upwardly into an enlarged counterbore 18 opening outwardly at the upper end of the body, the passageway and counterbore forming a flowway through the body. The body may also have an externally enlarged portion 20 which may be shaped to receive a wrench by which the fitting may be applied and removed.

The lower end face of the fitting forms a valve seat and is provided with an external annular end groove 22 for the reception of suitable packing means such as the O-ring 24, and the upper end face of the body may likewise have an annular groove 26 therein for the reception of similar packing means, such as O-ring 28.

A valve stem 30 extends through the passageway 16 of the body 10 and into the counterbore 18 thereof, which stem is of substantially smaller external diameter than the internal diameter of the passageway to permit the flow of fluid through the passageway about the stem, and a valve 32 is carried on the lower end of the stem in position to move into sealing engagement with the O-ring 24 upon upward movement of the valve stem to close the fitting against the escape of fluid from the apparatus. At its upper end the valve stem carries an externally enlarged head 34, which in the present illustration is of rectangular cross-section, and is attached to the upper end of the stem by means of a screw 36, in the manner illustrated in Figure 1. This head may be provided with a transverse end slot 38 at its upper end, for a purpose later to be made apparent, and the lower end face of the head serves as a seat for a resilient element, such as a coil spring 40, which bears at one end beneath the head and at the other end against the bottom of the counterbore 18 to urge the valve stem and valve toward closed position.

The body 10 is also formed with an external longitudinal escape groove 42 which extends from the upper end of the body throughout the length of the externally threaded upper end portion 13.

The combined lengths of the stem 30 and head 34 is greater than the length of the body 10, so that in the closed position of the valve 32, the head 34 will project somewhat above the upper end face of the body in position to be engaged by an appliance attached to the upper end of the body to move the valve stem or valve to open position against the pressure of the spring 40 in the manner illustrated in Figures 1, 5 and 6 of the drawings.

The fitting of the invention may also include a closure cap, such as that designated 68 in Figures 4 and 5, which cap is internally threaded to be screwed onto the upper end of the fitting into sealing engagement with the O-ring 28, as best seen in Figure 5, to close the fitting. Upon unscrewing of the cap 68, the inner surface of the cap will move out of contact with the O-ring 28, while the cap is still in engagement with the head 34 to hold the valve 32 in open position, as shown in Figure 4, whereupon fluid may bleed off from the apparatus through the groove 42. After the pressure within the apparatus has been relieved in this manner, the apparatus may be opened without danger to the operator due to the sudden release of internal pressure.

Figure 2:
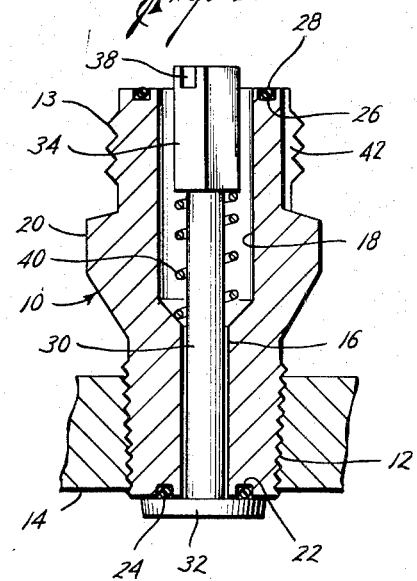
Figure 2 is a view similar to that of Figure 1 showing the fitting of the invention with the appliance removed therefrom and the valve in closed position.
Figure 3:
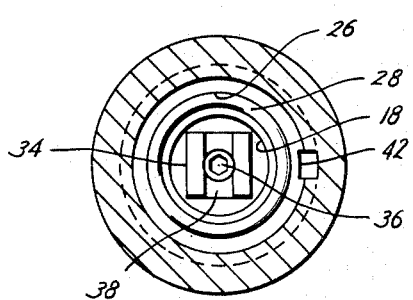
Figure 3 is a cross-sectional view, taken along the line 3—3 of Figure 1, looking in the direction indicated by the arrows.

In the event that an appliance is to be connected in communication with the apparatus to receive from or supply fluid under pressure to the apparatus, the cap 68 may be completely removed, whereupon the valve 34 will be closed by the spring 40, as shown in Figure 2 to prevent outflow of fluid from the apparatus, in order to permit the ready connection of an appliance to the fitting.

The invention may be employed with various kinds of appliances each of which includes means for attaching the same to the body, and such attaching means may be regarded as a part of the fitting. One such appliance is illustrated in Figure 1, wherein the fitting is shown with an appliance 44 connected thereto adapted to act as a safety valve. The safety valve appliance illustrated in Figure 1 may take the form of a tubular casing 46, having an internally threaded lower end portion 48 adapted to be threadably connected to the externally threaded upper end portion 13 of the body 10 and whose upper end is internally threaded, as indicated at 50 to receive a closure plug 52. An internal web 54 is provided in the casing 46, which is positioned to engage the head 34 to move the valve 32 to open position when the appliance is screwed onto the fitting as far as possible, and which also forms a fluid tight seal with the O-ring 28 to the escape of fluid from the interior of the body through the groove 42. Above the web 54 the casing has an outlet port 56 and the web 54 has an opening 58 therethrough which fluid may escape from the inside of the body 10, by way of the end slot 38 of the head 34.

Within the casing 46 above the web 54 a piston 60 is movably disposed, which is urged toward the web 54 by a coil spring 62 which bears at one end upon the piston and at its other end against the plug 52.

In its downmost position the piston 60 closes the port 56 and the opening 58, and the piston may have an annular end groove 64 therein for the reception of an O-ring 66 which forms a fluid tight seal between the piston and web when the piston is in its lowermost position.

To connect the above described safety valve appliance to the fitting, the cap 68 may be removed, as described, whereupon the valve 32 will close, and thereafter the casing 46 may be screwed onto the fitting in the manner illustrated in Figure 1 to open the valve 32. In this condition of the device the spring 62 holds the piston 60 in its closing position under a predetermined pressure which may be adjusted by means of the screw plug 52. Upon an increase in pressure in the apparatus above the predetermined pressure, the piston will be forced upwardly against the spring 52 to establish communication between the opening 58 and port 56 to relieve the pressure within the apparatus. The safety valve appliance when connected to the body thus becomes a removable part of the fitting.

Another example of the application of the invention is illustrated in Figure 6, wherein a meter, gauge, or other equipment, indicated generally at 70 is connected in communication with the apparatus through the fitting. In this application of the invention the cap 68 is removed and a connector member 72 substituted therefor, which has a central passageway 74 therethrough provided with an internally threaded portion 76 into which the inlet connection of the device 70 is threaded. When the member 72 is screwed down upon the fitting a fluid tight seal is formed with the O-ring 26 and the member engages the head 34 to move the valve 32 to open position, whereupon fluid may flow through the fitting and through slot 38 and passageway 74 to the device 70.

It will be apparent that upon the removal of any appliance from the fitting the valve 34 will immediately close to shut off the outflow of fluid from the apparatus and upon the connection of another appliance to the fitting the outflow of fluid through the fitting will again be established.

The invention provides a fitting which may be utilized in connection with many different types of apparatus, such as pipe lines, tanks, pressure vessels, and other equipment into or out of which it may be desired to cause a fluid under pressure to flow.

It will thus be seen that the invention, constructed and used in the manner described above, provides a fitting which may be economically manufactured and which functions as a safety device for the protection of an operator making use of the same.

While certain specific construction and manner of use of the invention has been disclosed herein, it will be understood that this is intended by way of example only, and that numerous changes can be made in the construction and arrangement of the various parts, without departing from the spirit of the invention or the scope of the appended claim.

Having thus clearly shown and described the invention, what is claimed as new and desired to secure by Letters Patent is:

A fitting for pressure fluid equipment comprising a body having a flowway therethrough and a valve seat surrounding the flowway, means on the body for connecting the body to a source of fluid under pressure with said flowway in communication with said source, valve means movably mounted on the body for movement into engagement with the seat to close the flowway and out of engagement with the seat to open the flowway, yieldable means carried by the body in position to coact with the body and valve means to yieldingly urge the valve means into engagement with the seat, said body having an external groove, a tubular member threadably connected to the body and in communication at one end with the flowway, said member being positioned to form with said groove an escape passageway in communication with said flowway and with the exterior of the body and being movable to one position out of sealing contact with the body to open said passageway and to another position in sealing contact with the body to close the passageway, means on the member closing the other end of the member, said member having an opening mediate its ends in communication with the interior of the member and leading to the exterior thereof, means movably disposed in the member and movable therein to one position to close said opening and to another position to open the same, said valve means being positioned for engagement with said member to move the valve means out of engagement with said seat.

References Cited in the file of this patent

UNITED STATES PATENTS

| | | |
|---|---|---|
| 1,082,182 | Van Winkle | Dec. 23, 1913 |
| 1,223,179 | Kelly | Apr. 17, 1917 |
| 1,226,199 | Evans | May 15, 1917 |
| 1,250,503 | Ray | Dec. 18, 1917 |
| 1,252,206 | Vormeng | Jan. 1, 1918 |
| 1,299,571 | Grounds | Apr. 8, 1919 |
| 1,343,819 | Grenci | June 15, 1920 |
| 1,490,628 | Myers | Apr. 15, 1924 |
| 1,519,231 | Benjamin | Dec. 16, 1924 |
| 1,597,200 | Johnson | Aug. 24, 1926 |
| 1,645,156 | Rowe | Oct. 11, 1927 |
| 1,855,264 | Thompson | Apr. 26, 1932 |
| 2,505,949 | DeVilbiss | May 2, 1950 |